(12) United States Patent
Tsutsui

(10) Patent No.: US 11,800,033 B2
(45) Date of Patent: Oct. 24, 2023

(54) IMAGE READING APPARATUS AND IMAGE READING METHOD FOR CALIBRATING A READING UNIT

(71) Applicant: SEIKO EPSON CORPORATION, Tokyo (JP)

(72) Inventor: Rei Tsutsui, Kitakyushu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/664,160

(22) Filed: May 19, 2022

(65) Prior Publication Data
US 2022/0377194 A1 Nov. 24, 2022

(30) Foreign Application Priority Data
May 19, 2021 (JP) ................................. 2021-084545

(51) Int. Cl.
*H04N 1/46* (2006.01)
*H04N 1/00* (2006.01)

(52) U.S. Cl.
CPC ....... *H04N 1/00819* (2013.01); *H04N 1/0097* (2013.01); *H04N 1/00689* (2013.01); *H04N 1/00692* (2013.01); *H04N 1/00779* (2013.01); *H04N 1/00822* (2013.01); *H04N 1/00896* (2013.01)

(58) Field of Classification Search
None
See application file for complete search history.

(56) References Cited

U.S. PATENT DOCUMENTS

| | | | |
|---|---|---|---|
| 9,013,758 B1* | 4/2015 | Sung | H04N 1/00819 358/406 |
| 2005/0259276 A1* | 11/2005 | Smith, II | H04N 1/4072 358/1.9 |
| 2007/0285743 A1* | 12/2007 | Hirayama | H04N 1/6033 358/1.9 |
| 2014/0376036 A1* | 12/2014 | Sugi | H04N 1/506 358/1.15 |
| 2019/0109957 A1* | 4/2019 | Date | B41J 29/393 |
| 2020/0309725 A1* | 10/2020 | Madhiwala | G01N 27/3274 |
| 2022/0038603 A1* | 2/2022 | Shiga | H04N 1/4078 |
| 2022/0345586 A1* | 10/2022 | Kamio | H04N 1/1215 |

FOREIGN PATENT DOCUMENTS

JP 2013130561 A 7/2013

\* cited by examiner

*Primary Examiner* — Dung D Tran
(74) *Attorney, Agent, or Firm* — CHIP LAW GROUP

(57) ABSTRACT

An image reading apparatus executes a calibration processing of calibrating a reading unit when a medium detection sensor detects that a medium is present. The image reading apparatus executes the calibration processing each time a first time-period elapses in a state where the medium detection sensor detects that the medium is present after the calibration processing. When a start instruction of reading the medium is received, the image reading apparatus starts transport of the medium and causes the reading unit to read the medium on a basis of calibration information of a last calibration processing.

17 Claims, 12 Drawing Sheets

IMAGE READING APPARATUS AND IMAGE READING METHOD FOR CALIBRATING A READING UNIT

The present application is based on, and claims priority from JP Application Serial Number 2021-084545, filed May 19, 2021, the disclosure of which is hereby incorporated by reference herein in its entirety.

BACKGROUND

1. Technical Field

The present disclosure relates to an image reading apparatus and an image reading method for calibrating a reading unit.

2. Related Art

A scanner transports a medium as a document to be read, and optically reads the medium that is being transported, with a reading unit. In such a scanner, the output of the reading unit is degraded from a proper value due to environmental changes, such as temperature, and changes over time, and therefore it is necessary to perform processing of calibrating the reading unit. This processing is also referred to as calibration.

In addition, a reading apparatus that causes a sensor unit of a scanner unit to read a calibration member before an inspection pattern printed on a sheet is read by the scanner unit, and performs the calibration of the sensor unit on the basis of the measurement result of the calibration member has been disclosed (see JP-A-2013-130561).

It is not necessary to perform the calibration of the reading unit before the reading unit is caused to read the medium, but the calibration takes a certain amount of time. Therefore, as in the related art, when the calibration is executed after the scanner receives a reading start instruction, it takes a long time to start the transport for reading the medium and start the reading, making the user wait. In other words, the response time from the above-described start instruction made by the user to the actual start of the transport for the medium reading and the reading has not been fast enough. In addition, in the scanner, even in the case where the calibration has been executed before receiving the start instruction in order to avoid reduction of the response speed, the calibration has to be executed again because of the calibration that has become old if a certain period time has elapsed from the calibration at the time point of the reception of the start instruction, and consequently, it has been difficult to solve the reduction in response speed.

SUMMARY

An image reading apparatus includes: a medium placing part at which a medium is placed, a medium detection sensor configured to detect presence or absence of the medium at the medium placing part, a transport unit configured to transport the medium placed at the medium placing part, a reading unit configured to read the medium transported by the transport unit and output a reading result, and a control unit configured to control the transport unit and the reading unit. The control unit executes a calibration processing of calibrating the reading unit when the medium detection sensor detects that the medium is present, the control unit executes, after the calibration processing, the calibration processing each time a predetermined first time-period elapses in a state where the medium detection sensor detects that the medium is present and when a start instruction of reading the medium is received, the control unit starts transport of the medium by the transport unit, and causes the reading unit to read the medium on a basis of calibration information of a last calibration processing.

An image reading method includes: a medium detection step of detecting presence or absence of a medium at a medium placing part at which the medium is placed, a transporting step of transporting the medium placed at the medium placing part, a reading step of reading, by a reading unit, the medium transported and outputting a reading result, a calibration step of calibrating the reading unit when the presence of the medium is detected in the medium detection step, and a calibration repeating step of repeating, after the calibration step, the calibration each time a predetermined first time-period elapses in a state where the presence of the medium is detected in the medium detection step. When a start instruction of reading the medium is received, the transporting step is started, and the reading step is started on a basis of calibration information of a last calibration.

DESCRIPTION OF EXEMPLARY EMBODIMENTS

Embodiments of the present disclosure are described below with reference to the drawings. Note that the drawings are merely exemplifications for describing the embodiments. The drawings are exemplifications, and therefore the proportions and shapes may not be exact, may not be consistent with each other, and some parts may be omitted.

1. Device Configuration

Figure 1:
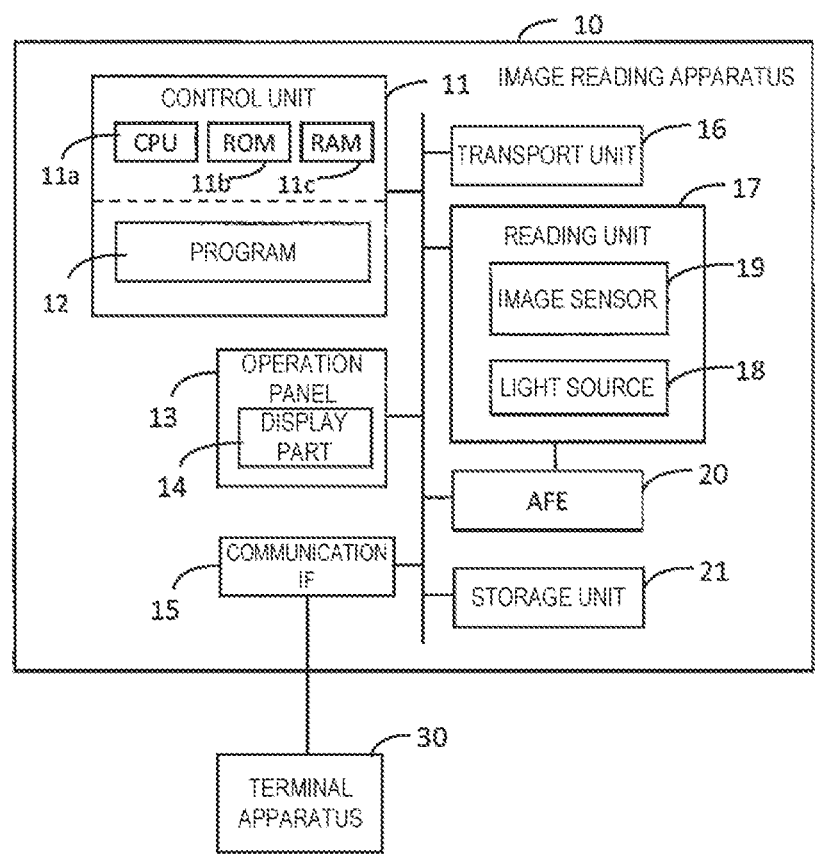
FIG. 1 is a block diagram schematically illustrating a configuration of an image reading apparatus.

FIG. 1 is a diagram schematically illustrating a configuration of an image reading apparatus 10.

The image reading apparatus 10 includes a control unit 11, an operation panel 13, a communication IF 15, a transport unit 16, a reading unit 17, an AFE 20, a storage unit 21 and the like. The operation panel 13 includes a display part 14. The display part 14 is a means for displaying visual information, and is composed of a liquid crystal display, an organic EL display or the like, for example. IF is an abbreviation of interface. AFE is an abbreviation of analog front end. The control unit 11 is composed of one or a plurality of ICs including a CPU 11a as processingor, a ROM 11b, a RAM 11c and the like, other nonvolatile memories, and the like.

The control unit 11 controls each unit of the image reading apparatus 10, when the processor, i.e., the CPU 11a executes arithmetic processing according to one or more programs 12 stored in the ROM 11b, other memories or the like, with the RAM 11c and the like used as a working area. The image reading apparatus 10 implements an image reading method. Note that the processor is not limited to one CPU, and may be configured such that the processing is performed by a plurality of CPUs and/or a hardware circuit such as ASIC, or that the processing is performed by the CPU and the hardware circuit in conjunction with each other.

The operation panel 13, serving as a means for receiving an operation by the user, is implemented in the form of a physical button, a touch panel, a keyboard or the like, for example. The touch panel is implemented as one function of the display part 14. The communication IF 15 is a collective term of one or a plurality of IFs for the image reading apparatus 10 to connect with the outside in a wired or wireless manner in compliance with a predetermined communication protocol including publicly known communication standards. In the example illustrated in FIG. 1, the image reading apparatus 10 is communicatively connected with an external terminal apparatus 30 through the communication IF 15.

The transport unit 16 transports a document to be read by the reading unit 17 along a predetermined transport path. The image reading apparatus 10, provided with the transport unit 16, may be referred to as sheet feed scanner. In this embodiment, a document is referred to also as "medium". The transport unit 16 includes, for example, a roller for transporting a medium, a motor for rotating a roller and the like. The reading unit 17 optically reads a medium transported by the transport unit 16. The reading unit 17 includes a light source 18 for irradiation of a medium, an image sensor 19 including a plurality of photoelectric conversion elements for receiving transmission light and/or reflection light from a medium and performing photoelectric conversion of it, an optical system such as a lens and a mirror not illustrated in the drawing, and the like, for example.

The image sensor 19 outputs, to the AFE 20, a reading result in the form of an electronic signal generated by each photoelectric conversion element in accordance with the light reception amount. The AFE 20 is a circuit that converts, into digital data, an electric signal as analog data output from the image sensor 19. The AFE 20 can perform correction processing and image processing on the analog data and the digital data. The AFE 20 outputs the digital data subjected to the processing such as the conversion processing, to the control unit 11 as a reading result of the medium. The digital data as a reading result of the medium received by the control unit 11 from the AFE 20 is also referred to as read image data. Note that the AFE 20 may be regarded as a part of the reading unit 17, or a part of the control unit 11.

The storage unit 21 is, for example, a storage means composed of a hard disk drive, a solid-state drive, or other memories. A part of the memory provided in the control unit 11 may be regarded as the storage unit 21. The storage unit 21 may be regarded as a part of the control unit 11.

The image reading apparatus 10 may be implemented as one independent scanner, or a system composed of a plurality of apparatuses communicatively connected to each other. For example, the image reading apparatus 10 may be implemented with a scanner including the transport unit 16, the reading unit 17 and the AFE 20, and a control apparatus including the control unit 11 and the storage unit 21.

The image reading apparatus 10 may be a multifunctional device that functions as a printer, a facsimile machine and the like, in addition to the function as a scanner.

The terminal apparatus 30 is, for example, a personal computer (PC), a network server, a tablet terminal, a smartphone, or an information processing device having a function similar to theirs. In the terminal apparatus 30, programs such as an application and a driver for controlling the image reading apparatus 10 are installed.

Figure 2:
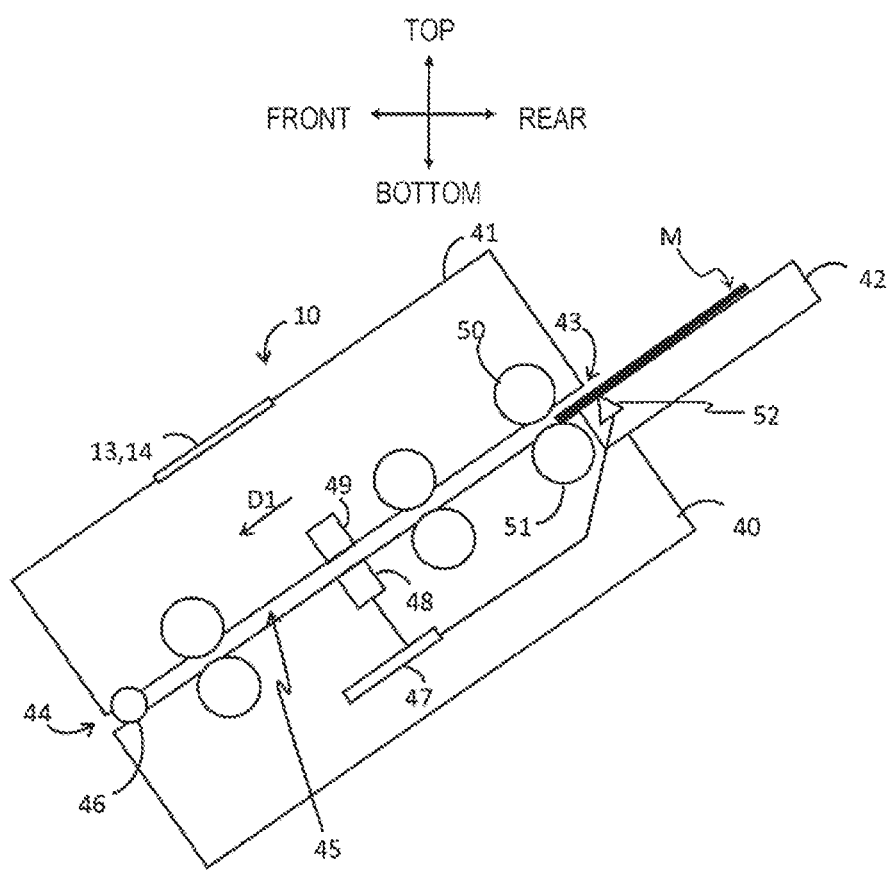
FIG. 2 is a diagram schematically illustrating an internal configuration of the image reading apparatus and the like as viewed from a lateral side.

FIG. 2 schematically illustrates a lateral perspective view of an internal configuration including a transport path 45 of the image reading apparatus 10, and the like. In FIG. 2, the upper, lower, front and rear directions with respect to the image reading apparatus 10 are illustrated. The image reading apparatus 10 includes a lower unit 40 and an upper unit 41 as housings. The lower unit 40 and the upper unit 41 face each other with the transport path 45, through which a medium M being transported passes, therebetween. The lower unit 40 is installed on a horizontal surface with a base not illustrated in the drawing, and the upper unit 41 covers the upper side of the lower unit 40.

In the example illustrated in FIG. 2, the lower unit 40 and the upper unit 41 are coupled with each other with a hinge 46, and the upper unit 41 can turn about the hinge 46. The user can close and open the upper unit 41 by turning the upper unit 41. In FIG. 2, the upper unit 41 is in a closed state. The reference number 43 denotes a supply port 43 located upstream of the transport path 45, and the reference number 44 denotes an ejection port 44 located downstream of the transport path 45. The reference number D1 denotes a transport direction D1 from the upstream side to the downstream side of the transport path 45. A document tray 42 where the medium M is placed is disposed on the rear side of the lower unit 40. The document tray 42 is an example of "medium placing part". The document tray 42 may be referred to as sheet feed tray or the like.

The medium M placed on the document tray 42 is taken into the transport path 45 from the supply port 43, transported downstream through the transport path 45, and ejected from the ejection port 44. In the example illustrated in FIG. 2, the ejection port 44 is located on the front side than the supply port 43. FIG. 2 illustrates, as an example of the transport unit 16, some roller pairs disposed at the lower unit 40 and the upper unit 41 to face each other with the transport path 45 therebetween. The roller pairs are disposed at intervals along the transport path 45. Each roller pair transports the medium M by rotating with the power of a motor not illustrated in the drawing, with the medium M sandwiched between the paired rollers.

Among the roller pairs, the roller pair of rollers 50 and 51 on the most upstream side is disposed at a position slightly downstream of the supply port 43. The roller pair takes the medium M placed on the document tray 42 into the transport path 45 one by one and transports it to the downstream side. The description for each of other roller pairs will be omitted. In the transport path 45 downstream of the roller pair of the rollers 50 and 51, a first image sensor 48 is provided at the lower unit 40, and a second image sensor 49 is provided at the upper unit 41. Each of the first image sensor 48 and the second image sensor 49 corresponds to the image sensor 19. The first image sensor 48 reads the surface facing the lower unit 40 of the medium M transported downstream through the transport path 45, and the second image sensor 49 reads the surface facing the upper unit 41 of the medium M transported downstream through the transport path 45.

The reference number 47 denotes a circuit board 47 in which the control unit 11, the AFE 20 and the like are mounted. Although not specifically described, the second image sensor 49, the operation panel 13 and the like are also coupled to the circuit board 47, in addition to the first image sensor 48. The operation panel 13 including the display part 14 is disposed at a position easily visible from the outside of the upper unit 41. Note that in this embodiment, the reading unit 17 need not necessarily include the upper and lower image sensors, such as the first image sensor 48 and the second image sensor 49, for simultaneously reading the both surfaces of the medium M, and the image sensor 19 may be only one of the first image sensor 48 and the second image sensor 49. In the following description, the first image sensor 48 and the second image sensor 49 are not discriminated from each other, and are simply referred to as the image sensor 19.

The image sensor 19 is a line sensor composed of a plurality of photoelectric conversion elements arranged in a direction that intersects the transport direction D1. Here, the intersection may be interpreted as being orthogonal or substantially orthogonal. Specifically, the surface of the medium M is two-dimensionally read by changing the relative positions of the image sensor 19 serving as a line sensor and the medium M in the transport direction D1. In the following description, the direction that intersects the transport direction D1 may be referred to as the "width direction" of a medium.

The image reading apparatus 10 includes a medium detection sensor 52 that can detect the presence or absence of the medium M in the document tray 42. In the example illustrated in FIG. 2, the medium detection sensor 52 is provided at a position in the vicinity of the supply port 43 in the document tray 42. The way of detecting the medium M at the medium detection sensor 52 is not limited, and various sensors such as optical sensors and mechanical sensors may be employed. A signal indicating a detection result of the medium detection sensor 52 is sent to the control unit 11.

2. Image Reading Process Including Calibration Process

Figure 3:
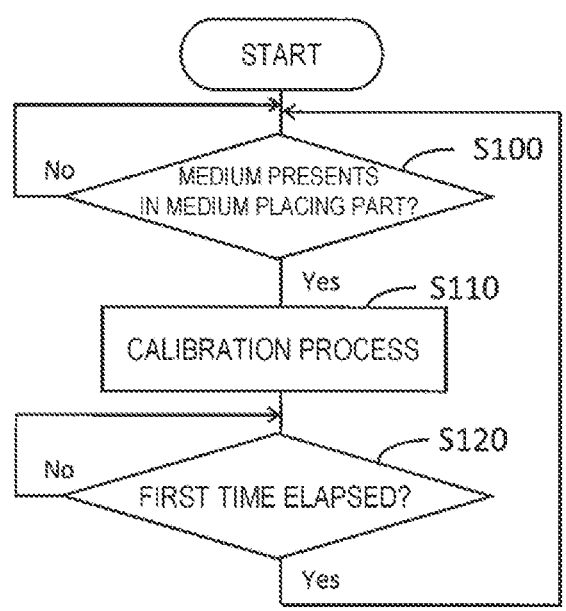
FIG. 3 is a flowchart of processing of repeating a calibration processing.
Figure 4:
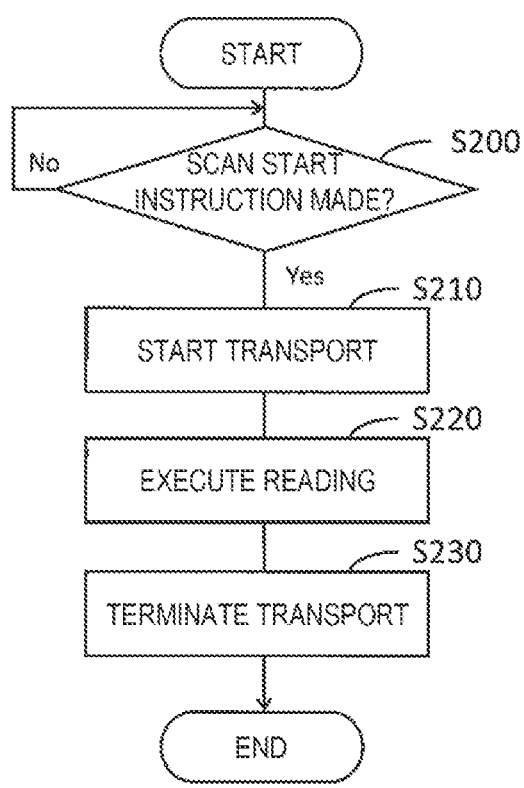
FIG. 4 is a flowchart of processing of reading a medium in response to a scan start instruction.

FIGS. 3 and 4 illustrate flowcharts of image reading processing including a calibration processing that is executed by the control unit 11 in accordance with the program 12. FIG. 3 illustrates a flowchart of processing of repeatedly executing the calibration processing, and FIG. 4 illustrates a flowchart of processing of reading a medium in response to a scan start instruction.

As illustrated in FIG. 3, the control unit 11 determines the presence or absence of the medium at the medium placing part (step S100). In the state where a detection result indicating "no medium is present" is input from the medium detection sensor 52, the control unit 11 repeatedly determines that no medium is present in the placing part ("No" at step S100). In the case where a detection result indicating "medium is present" is input from the medium detection sensor 52, the control unit 11 determines that a medium is present at the medium placing part ("Yes" at step S100), and advances the process to step S110. Accordingly, in the flowchart of FIG. 3, first, when the user puts a medium in the document tray 42 in the state where no medium is present in the document tray 42, it is determined as "Yes" at step S100d. Step S100 corresponds to the "medium detection step" of detecting the presence or absence of the medium at the medium placing part.

At step S110, a "calibration processing" of calibrating the reading unit 17 is executed. The calibration processing is processing of adjusting each unit including the reading unit 17 such that the output through the reading unit 17, i.e., read image data, finally has a proper value. More specifically, in the state where there is no medium M in the transport path 45, the control unit 11 causes the image sensor 19 to read the reference color of the calibration, such as the color of the background plate, not illustrated in the drawing, disposed in the transport path 45. Then, a necessary adjustment is made such that the reading result of the reference color has an ideal value set in advance as the reading result of the reference color. Here, the adjustment is, for example, the adjustment of the light emission intensity and the light emission time of the light source 18, the adjustment of the gain of the AFE 20 for the output from the image sensor 19, and the like. In addition, the control unit 11 may perform a shading correction for limiting the variation of the black level and the white level of each pixel in the width direction due to the variation of the output of each photoelectric conversion element of the image sensor 19.

The control unit 11 stores the result and the value of the adjustment and the correction as the calibration processing, as calibration information in the storage unit 21. The calibration processing spans from the generation of the calibration information to the storage of it in the storage unit 21. The first step S110 executed in the flowchart of FIG. 3 corresponds to the "calibration step" of calibrating the reading unit 17 when it is determined that a medium is present at the medium detection step.

At step S120, the control unit 11 determines whether a predetermined first time-period has elapsed after the calibration processing of step S110 is finished, and when it is determined that the first time-period has elapsed, the control unit 11 advances the process to step S100 from the determination "Yes". While the first time-period can be arbitrarily set by the user, the first time-period is, for example, 120 seconds. As illustrated in FIG. 3, when a medium is present at the medium placing part ("Yes" at step S100) and the first time-period has elapsed after the calibration processing of step S110 is finished ("Yes" at step S120), the control unit 11 performs the calibration processing again at step S110. The second and subsequent steps S110 executed in the flowchart of FIG. 3 correspond to the "repetitive calibration step" of repeating the calibration each time the first time-period elapses in the state where the presence of the medium is detected by the medium detection step, after the calibration step.

In this manner, by performing the calibration processing each time the first time-period elapses when the medium is placed at the medium placing part, the control unit 11 can store the latest calibration information in the storage unit 21. It can be said that the first time-period is the upper limit of the time for which the reliability of the calibration information is maintained.

Note that when no medium is present at the medium placing part ("No" at step S100) and the first time-period has elapsed after the calibration processing of step S110 is finished ("Yes" at step S120), and, the medium is placed at the medium placing part by the user again, the control unit 11 executes step S110.

At step S200 in FIG. 4, the control unit 11 determines whether a start instruction of reading the medium has been made. Such a start instruction is referred to as "scan start instruction". The scan start instruction is input to the image reading apparatus 10 through the communication IF 15 from the terminal apparatus 30 operated by the user, for example. In addition, the scan start instruction is input to the image reading apparatus 10 also when a predetermined start button in the operation panel 13 is pressed by the user. When recognizing the input of the scan start instruction, the control unit 11 determines it as "Yes" at step S200, and advances the process to step S210.

The user makes the scan start instruction in the state where the medium is present at the medium placing part. Therefore, in this embodiment, it is assumed that the scan start instruction is input in the state where the medium is present at the medium placing part. The input of the scan start instruction in the state where the medium is present at the medium placing part means that, as can be understood from the description so far, the calibration information of the calibration processing executed within the past first time-period is stored in the storage unit 21 at the time point when the scan start instruction is input.

At step S210, the control unit 11 controls the transport unit 16 to start the transport of the medium placed at the medium placing part.

At step S220, subsequent to step S210, the control unit 11 controls the reading unit 17 to read the medium that is being transported. At this time, the control unit 11 causes the reading unit 17 to read the medium on the basis of the latest calibration information stored in the storage unit 21 at that time point, i.e., the calibration information of the last calibration processing. The reading based on the calibration information is processing of outputting the read image data by performing shading correction in accordance with the calibration information, and adjustment of the light emission intensity and the light emission time of the light source 18, the gain of the AFE 20 and the like in accordance with the calibration information.

After the reading of the medium, the control unit 11 causes the transport unit 16 to eject the medium of the transport target, and terminates the transport at the transport unit 16 (step S230). In this manner, the flowchart of FIG. 4 for a single medium is completed. The steps S210 to S230 correspond to the "transporting step" of transporting the medium placed at the medium placing part, and the "reading step" of reading the medium that is being transported by the reading unit 17 and outputting the reading result. In addition, in FIG. 4, when receiving the scan start instruction, the control unit 11 starts the transporting step, and starts the reading step based on the calibration information of the last calibration. The control unit 11 may further perform processing such as binary conversion on the read image data acquired as a result of step S220, may store the read image data in memories provided inside/outside the image reading apparatus 10, may transmit the read image data to the terminal apparatus 30 through the communication IF 15, may print the read image data by using a printer function, or may transmit the read image data to a predetermined destination by using a facsimile function.

As described above, according to this embodiment, the image reading apparatus 10 includes a medium placing part at which a medium is placed, the medium detection sensor 52 configured to detect the presence or absence of the medium at the medium placing part, the transport unit 16 configured to transport the medium placed at the medium placing part, the reading unit 17 configured to read the medium transported by the transport unit 16 and output the reading result, and the control unit 11 configured to control the transport unit 16 and the reading unit 17. The control unit 11 executes the calibration processing of calibrating the reading unit 17 when the medium detection sensor 52 detects that a medium is present, executes, after the calibration processing, the calibration processing each time the predetermined first time-period elapses in the state where the medium detection sensor 52 detects that the medium is present, starts transport of the medium by the transport unit 16 when a start instruction of reading the medium is received, and causes the reading unit 17 to read the medium on the basis of the calibration information of the last calibration processing.

With this configuration, when a medium is placed at the medium placing part, the control unit 11 repeats the calibration processing each time the first time-period elapses after the calibration processing has been executed. In this manner, when the scan start instruction is received, it is possible to cause the reading unit 17 to read the medium on the basis of the calibration information of the last calibration processing without executing the calibration processing. That is, since it is not necessary to execute the calibration after receiving the scan start instruction, the reduction in response speed, which has been an issue in the related art, can be resolved. In addition, the calibration information of the last calibration processing is highly reliable since it is the calibration information of the calibration processing executed within the past first time-period at the time point when the scan start instruction is input, and thus the control unit 11 can obtain high quality reading results reflecting appropriate calibration. In addition, if the number of times of the calibration is needlessly increased, the reading unit 17 is worn each time and the lifetime of the product can be shortened, but with a certain limit on the number of the calibration, such as one for each first time-period in the state where a medium is placed at the medium placing part, the reduction in response speed can be resolved while suppressing the reduction in lifetime of the product.

This embodiment is not limited to the image reading apparatus 10 and the system, and discloses an image reading method configured to be executed by the apparatus and the system, and the program 12 that causes the processor to execute the method.

For example, the image reading method includes a medium detection step of detecting the presence or absence of the medium at the medium placing part at which the medium is placed, a transporting step of transporting the medium placed at the medium placing part, and a reading step of reading the medium that is being transported by the reading unit 17 and outputting the reading result. Further, the method includes a calibration step of calibrating the reading unit 17 when it is determined that a medium is present at the medium detection step, and a repetitive calibration step of repeating the calibration each time a predetermined first time-period elapses in the state where it is detected that the medium is present at the medium detection step after the calibration step, and when a start instruction of reading the medium is received, the transporting step is started, and the reading step is started based on the calibration information of the last calibration.

Regarding this embodiment, specific examples in consideration of various circumstances are described below. Each example will be described below based on the above description of the embodiment.

3. First Example

The control unit 11 can set the reading resolution of the reading unit 17 from among some resolutions. Here, the reading resolution is the reading resolution in the width direction and the transport direction D1, and can be set to 600 dpi and 300 dpi, for example. 600 dpi is an example of "first reading resolution", and 300 dpi is an example of "second reading resolution" lower than the first reading resolution. The image sensor 19 may be interpreted to include any number of photoelectric conversion elements that can read the medium at a first reading resolution in the width direction. When reading the medium at a second reading resolution, the control unit 11 may reduce the resolution by reducing the number of the photoelectric conversion elements driven for the reading, or conversely, reducing each pixel information read by each photoelectric conversion element, or, averaging it among neighboring pixels.

Under a circumstance where the reading resolution during the medium reading can be set from among some resolutions, it is also necessary to prepare the calibration information corresponding to each reading resolution.

In view of this, in the first example, in the calibration processing of step S110, the control unit 11 executes a "first calibration processing" of calibrating the reading unit 17 by setting the reading resolution of the reading unit 17 to the first reading resolution, and a "second calibration processing" of calibrating the reading unit 17 by setting the reading resolution of the reading unit 17 to the second reading resolution. Specifically, for each step S110, the first calibration processing and the second calibration processing are executed, and the calibration information of the first calibration processing and the calibration information of the second calibration processing are stored in the storage unit 21.

It suffices that in the first calibration processing, the control unit 11 generates the calibration information required for the reading unit 17 to read the medium at 600 dpi, by performing the above-described adjustment and shading correction by causing the reading unit 17 to read the reference color of the calibration at 600 dpi. In addition, it suffices that in the second calibration processing, the control unit 11 generates the calibration information required for the reading unit 17 to read the medium at 300 dpi, by performing the above-described adjustment and shading correction by causing the reading unit 17 to read the reference color of the calibration at 300 dpi.

Figure 5:
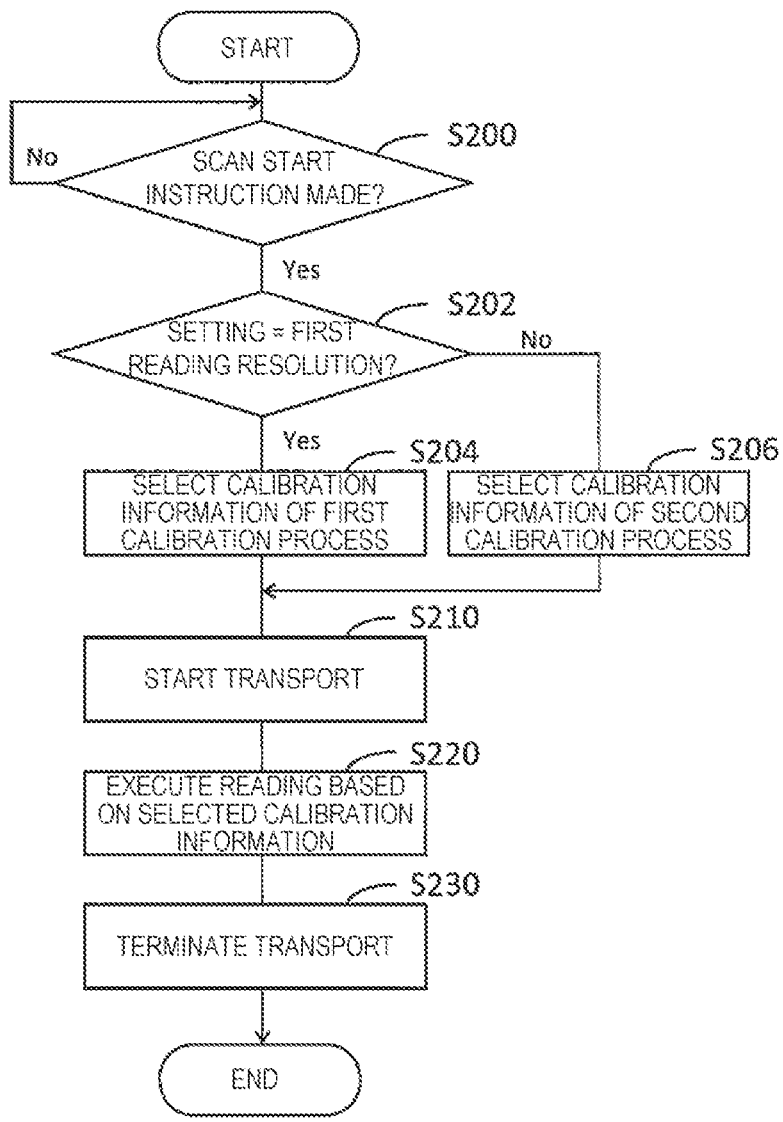
FIG. 5 is a flowchart of processing of reading a medium in response to a scan start instruction in a first example.

FIG. 5 illustrates a flowchart of processing of reading a medium that is executed in accordance with a scan start instruction in the first example. For FIG. 5, a difference from FIG. 4 is described.

After it is determined as "Yes" at step S200, the control unit 11 determines whether the setting of the reading resolution is the first reading resolution or the second reading resolution at step S202. For example, when a scan start instruction is input from the terminal apparatus 30, the scan start instruction includes the setting of the reading resolution. Accordingly, when the reading resolution set by the scan start instruction is the first reading resolution, the control unit 11 determines it as "Yes" at step S202 and advances the process to step S204, whereas when the reading resolution set by the scan start instruction is the second reading resolution, the control unit 11 determines it as "No" at step S202 and advances the process to step S206.

At step S204, the control unit 11 selects the calibration information of the first calibration processing, and advances the process to step S210. On the other hand, at step S206, the control unit 11 selects the calibration information of the second calibration processing, and advances the process to step S210. Steps S202, S204 and S206 only select one of the calibration information of the first calibration processing or the calibration information of the second calibration processing in accordance with the setting of the reading resolution, and as such take less time for the processing than the execution of the first calibration processing and the second calibration processing.

At step S220 after step S210, the control unit 11 controls the reading unit 17 to read the medium at the reading resolution according to the setting. At this time, the control unit 11 causes the reading unit 17 to read the medium on the basis of the calibration information that is the latest calibration information stored in the storage unit 21 at that time point and is the calibration information of the calibration processing selected at step S204 or at step S206. Thus, the control unit 11 can cause the reading unit 17 to read the medium on the basis of the calibration information corresponding to the reading resolution of the reading unit 17.

In this manner, according to the first example, the control unit 11 executes the first calibration processing of calibrating the reading unit 17 by setting the reading resolution of the reading unit 17 to the first reading resolution, and the second calibration processing of calibrating the reading unit 17 by setting the reading resolution to the second reading resolution lower than the first reading resolution, in the calibration processing. Then, when a start instruction of reading the medium is received, one of the calibration information of the first calibration processing and the calibration information of the second calibration processing is selected in accordance with the setting of the reading resolution according to the start instruction, and the reading unit 17 is caused to read the medium on the basis of the selected calibration information.

That is, when a medium is placed at the medium placing part, the control unit 11 repeats the first calibration processing and the second calibration processing each time the first time-period elapses after the first calibration processing and the second calibration processing is executed. Thus, when the scan start instruction is received, it is not necessary to perform both the first calibration processing and the second calibration processing, and it is possible to cause the reading unit 17 to read the medium on the basis of the calibration information that is the calibration information of the last calibration processing and is the calibration information corresponding to the reading resolution according to the setting.

4. Second Example

A second example, which is an example partially changed from the first example, is described below. At the calibration processing of step S110, the control unit 11 executes the first calibration processing of calibrating the reading unit 17 by setting the reading resolution of the reading unit 17 to the first reading resolution, and a "calibration information generation process" of generating the calibration information for calibrating the reading unit 17 of the case where the reading resolution is set to the second reading resolution, on the basis of the calibration information of the first calibration processing. That is, in the second example, the calibration information generation processing is executed in place of the second calibration processing at step S110. In the calibration information generation process, the reading unit 17 is not caused to read the reference color of the calibration, and therefore the processing time can be reduced by executing the first calibration processing and the calibration information generation processing than by executing the first calibration processing and the second calibration processing.

The control unit 11 executes the first calibration processing and the calibration information generation processing for each step S110, and stores the calibration information of the first calibration processing and the calibration information generated by the calibration information generation processing in the storage unit 21. In the calibration information generation process, it suffices that the control unit 11 generates the calibration information by reducing, or averaging it among neighboring pixels, the shading correction value of each pixel position in the width direction of the calibration information generated by the first calibration processing, so as to change it to the shading correction value required for the reading unit 17 to read the medium at 300 dpi, for example.

Figure 6:
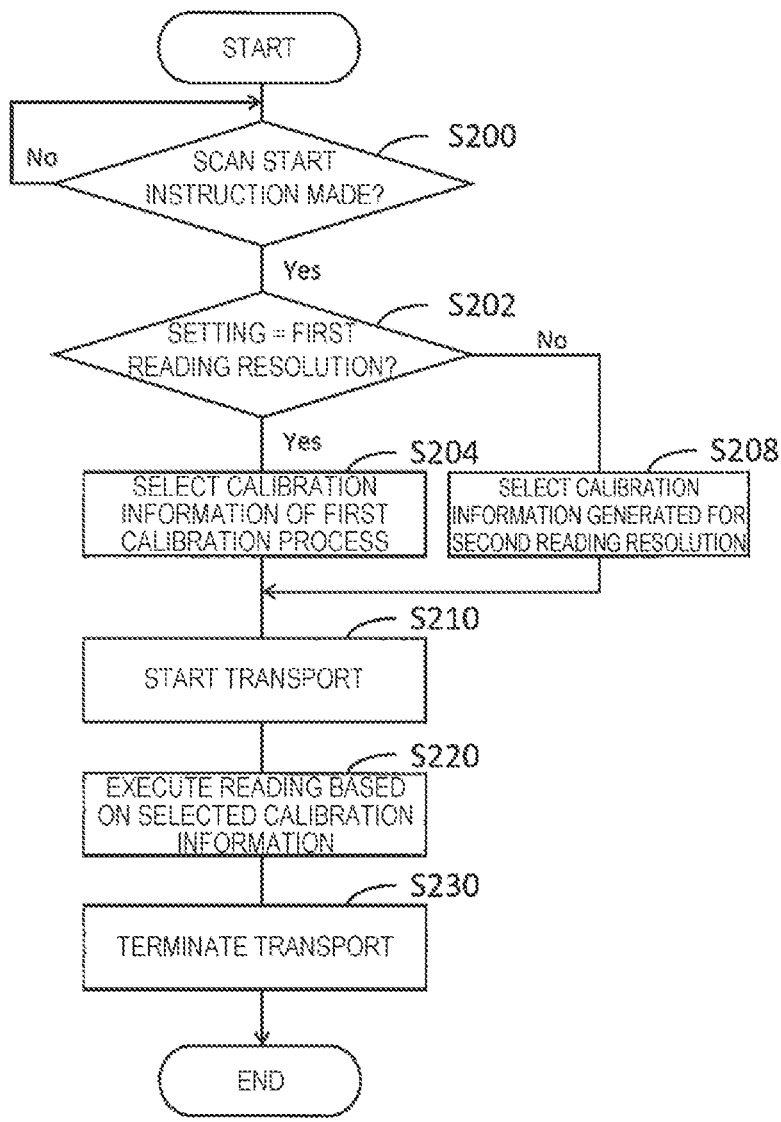
FIG. 6 is a flowchart of processing of reading a medium in response to a scan start instruction in a second example.

FIG. 6 illustrates a flowchart of processing of reading a medium that is executed in accordance with a scan start instruction in the second example. For FIG. 6, a difference from FIG. 5 is described.

When the reading resolution according to the setting is the first reading resolution, the control unit 11 determines it as "Yes" at step S202 and advances the process to step S204, whereas when the reading resolution according to the setting is the second reading resolution, the control unit 11 determines it as "No" at step S202 and advances the process to step S208.

At step S208, the control unit 11 selects the calibration information generated for the second reading resolution, i.e., the calibration information generated by the calibration information generation process, and advances the process to step S210.

At step S220, the control unit 11 controls the reading unit 17 to read the medium at the reading resolution according to the setting. At this time, the control unit 11 causes the reading unit 17 to read the medium on the basis of the calibration information selected at step S204 or step S208 that is the latest calibration information stored in the storage unit 21 at that time point.

In this manner, according to the second example, in the calibration processing, the control unit 11 executes the first calibration processing of calibrating the reading unit 17 by setting the reading resolution of the reading unit 17 to the first reading resolution, and the calibration information generation processing of generating the calibration information for calibrating the reading unit 17 of the case where the reading resolution is set to the second reading resolution lower than the first reading resolution, on the basis of the calibration information of the first calibration processing. Then, when a start instruction of reading the medium is received, one of the calibration information of the first calibration processing or the calibration information generated by the calibration information generation processing is selected in accordance with the setting of the reading resolution according to the start instruction, and the reading unit 17 is caused to read the medium on the basis of the selected calibration information.

That is, in the case where a medium is placed at the medium placing part, the control unit 11 repeats the first calibration processing and the calibration information generation processing each time the first time-period elapses after the first calibration processing and the calibration information generation processing are executed. Thus, it is not necessary to execute the first calibration processing or the calibration information generation processing when the scan start instruction is received, and the reading unit 17 can be caused to read the medium on the basis of the calibration information that is the calibration information of the last first calibration processing or the calibration information generation processing and is the calibration information corresponding to the reading resolution according to the setting.

Note that in the first example and the second example, the control unit 11 may generate and store pieces of calibration information respectively corresponding to more than two reading resolutions prior to the scan start instruction, and may select the calibration information corresponding to the reading resolution set to the reading unit 17 from among them after the scan start instruction is provided.

5. Third Example

The first example and the second example are suitable for a case where the setting of the reading resolution of the reading unit 17 is known when the scan start instruction is received.

On the other hand, the third example assumes a case where a "predefined reading resolution" as the reading resolution to be employed by the reading unit 17 for the reading of the medium is stored in the storage unit 21, and, when the user presses the start button of the operation panel 13, the control unit 11 determines it as "Yes" at step S200 and causes the reading unit 17 to execute the reading at the predefined reading resolution.

In the third example, in the calibration processing of step S110, the control unit 11 acquires, from the storage unit 21, the predefined reading resolution stored in the storage unit 21 as the reading resolution to be employed by the reading unit 17 for the reading of the medium, and calibrates the reading unit 17 by setting the predefined reading resolution as the reading resolution of the reading unit 17. For example, it suffices that in the case where the predefined reading resolution is 300 dpi, the control unit 11 performs the calibration by setting the reading resolution of the reading unit 17 to 300 dpi at step S110. In this case, at step S220 in FIG. 4, the control unit 11 controls the reading unit 17 to read the medium at the predefined reading resolution. At this time, the control unit 11 causes the reading unit 17 to read the medium on the basis of the latest calibration information corresponding to the predefined reading resolution that is stored in the storage unit 21 at that time point.

According to the third example, since the reading resolution to be employed by the reading unit 17 for the reading of the medium is known prior to the reception of the scan start instruction, the load of the calibration processing at step S110 can be reduced. Further, also in the third example as in the embodiment and examples described above, the control unit 11 need not necessarily perform the calibration processing of the reading unit 17 after receiving the scan start instruction.

6. Fourth Example

The control unit 11 may calibrate the reading unit 17 by setting, as the reading resolution of the reading unit 17, the reading resolution employed relatively large number of times in the past for reading of the medium (hereinafter referred to as prioritized reading resolution) among the reading resolutions that can be employed by the reading unit 17. In the fourth example, it is assumed that the prioritized reading resolution is stored in the storage unit 21.

In the fourth example, in the calibration processing of step S110, the control unit 11 acquires a prioritized reading resolution from the storage unit 21, and calibrates the reading unit 17 by setting the prioritized reading resolution to the reading resolution of the reading unit 17. For example, it suffices that in the case where the predefined reading resolution is 300 dpi, the control unit 11 performs the calibration by setting the reading resolution of the reading unit 17 to 300 dpi at step S110. At step S220 in FIG. 4, the control unit 11 controls the reading unit 17 to read the medium at the prioritized reading resolution in many cases. At this time, it suffices that the control unit 11 causes the reading unit 17 to read the medium on the basis of the latest calibration information corresponding to the prioritized reading resolution stored in the storage unit 21 at that time point.

According to the fourth example, as in the third example, the load of the calibration processing at step S110 can be reduced. In addition, according to the fourth example, it is highly likely that the control unit 11 need not necessarily execute the calibration processing of the reading unit 17 when receiving the scan start instruction. It should be noted that in the case where a reading resolution different from the prioritized reading resolution is set by the scan start instruction, it is necessary that at step S220 the control unit 11 cause the reading unit 17 to read the medium at the reading resolution according to the setting different from the prioritized reading resolution. In view of this, in the fourth example, in the case where a reading resolution different from the prioritized reading resolution is set, the control unit 11 exceptionally acquires the calibration information required for step S220 by executing the calibration processing of the reading unit 17 corresponding to the reading resolution according to the setting after "Yes" at step S200 and before step S210.

7. Fifth Example

The control unit 11 can cause the image reading apparatus 10 to shift from a predetermined normal mode to a power saving mode with lower power consumption than the normal mode. The normal mode is a mode for normally operating each function of image reading unit 10 without stopping it, and the power saving mode is a mode for reducing the power consumption by stopping the power supply to some functions such as the transport unit 16 and the reading unit 17. The power saving mode may be referred to as power-down mode or energy saving mode. Basically, the embodiment and examples described above assume that the mode is the normal mode.

Figure 7:
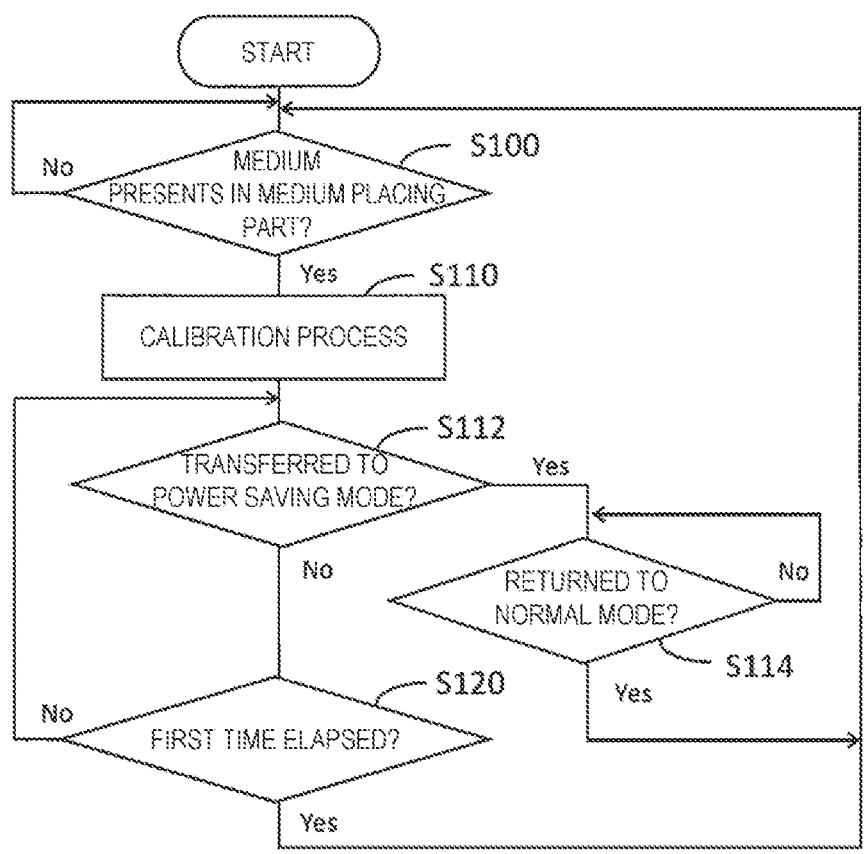
FIG. 7 is a flow flowchart of processing of repeating a calibration processing in a fifth example.

FIG. 7 illustrates a flowchart of processing of repeatedly executing the calibration processing in the fifth example. For FIG. 7, a difference from FIG. 3 is described.

After the calibration processing has been executed at step S110, the control unit 11 determines whether the mode should be shifted from the current normal mode to the power saving mode at step S112. There are various conditions for shifting from the normal mode to the power saving mode. For example, when receiving a shift instruction to the power saving mode through the operation panel 13 or the like, the control unit 11 determines that the mode should be shifted to the power saving mode.

In addition, the control unit 11 may determine that the mode should be shifted to the power saving mode when the time during which there is no input from the outside has been continued for a predetermined second time-period. The input from the outside is an input of an instruction and/or data through the operation panel 13 and/or the communication IF 15. In addition, the control unit 11 may determine that the mode should be shifted to the power saving mode when there is no input from the outside during the elapse of the second time-period after a state where no medium is present at the medium placing part is changed to a state where a medium is present at the medium placing part. The second time-period may be longer or shorter than the first time-period.

When it is determined that the mode should be shifted to the power saving mode, the control unit 11 causes the image reading apparatus 10 to shift from the normal mode to the power saving mode, and advances the process from "Yes" of step S112 to step S114. On the other hand, when it is not determined that the mode should be shifted to the power saving mode, the control unit 11 keeps the normal mode, and advances the process from "No" of step S112 to step S120.

At step S120, when it is determined that the first time-period has not elapsed after the calibration processing of step S110 ("No" at step S120), the control unit 11 repeats the determination at step S112. That is, in FIG. 7, in the case of the normal mode, the control unit 11 repeats the same process as in FIG. 3.

At step S114, the control unit 11 determines whether the mode should be returned from the power saving mode to the normal mode. When it is determined that the mode should be returned to the normal mode, the image reading apparatus 10 is returned from the power saving mode to the normal mode, and the process is advanced from "Yes" of step S114 to step S1100. During the power saving mode, when the input from the outside is recognized or when a user's predetermined operation of placing a medium at the medium placing part and the like are detected, the control unit 11 determines that the mode should be returned to the normal mode.

In the fifth example, during the power saving mode, the control unit 11 does not execute the calibration processing regardless of the elapse of the first time-period after the calibration processing of step S110. That is, when the mode is shifted from the normal mode to the power saving mode in the state where the medium detection sensor 52 detects that the medium is present, the control unit 11, in the power saving mode, does not execute the calibration processing even when the first time-period has elapsed. In this manner, the reduction of the power consumption of the power saving mode is appropriately achieved.

In addition, according to the fifth example, when the image reading apparatus 10 is returned from the power saving mode to the normal mode ("Yes" at step S114), the control unit 11 executes the calibration processing of step S110 in response to detection of a presence of a medium by the medium detection sensor 52 ("Yes" at step S100). That is, when the control unit 11 returns the image reading apparatus 10 from the power saving mode to the normal mode, the control unit 11 calibrates the reading unit 17 when it is determined that the medium is present at the medium placing part, and thereafter, calibrates the reading unit 17 each time the first time-period elapses. The fifth example may be combined with any of the first example to the fourth example, or with the sixth example and the seventh example described below.

8. Sixth Example

Figure 8:
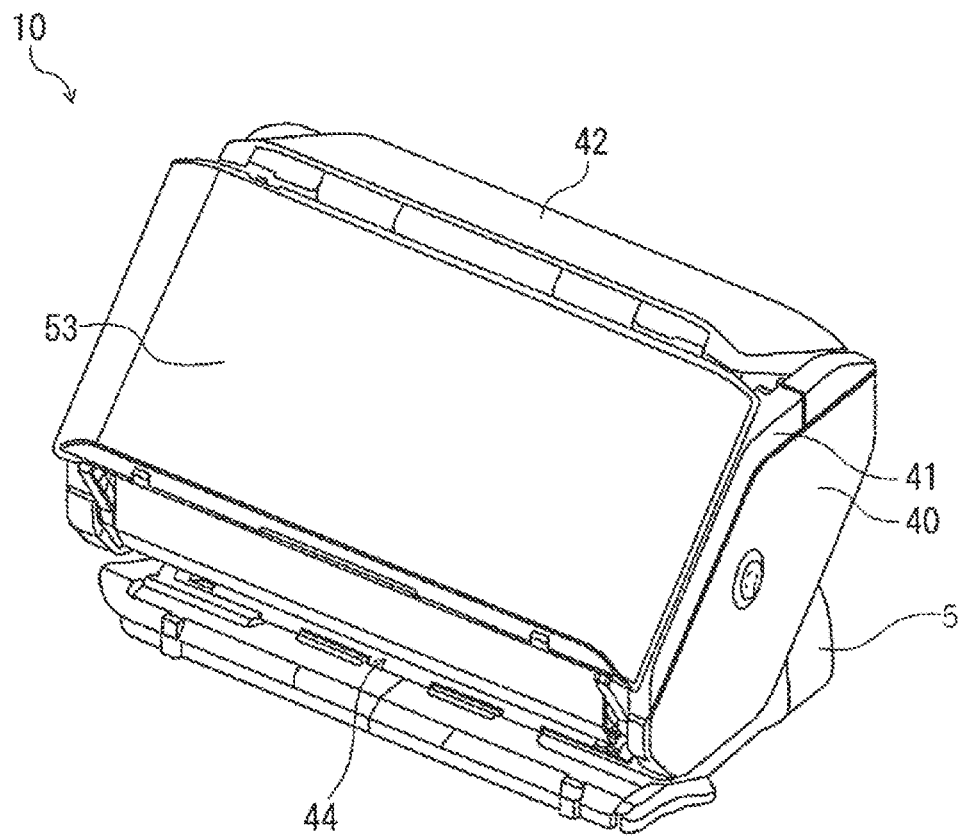
FIG. 8 is a perspective view illustrating an external appearance of the image reading apparatus with a document tray in a closed state and an ejection tray in a non-used posture.
Figure 9:
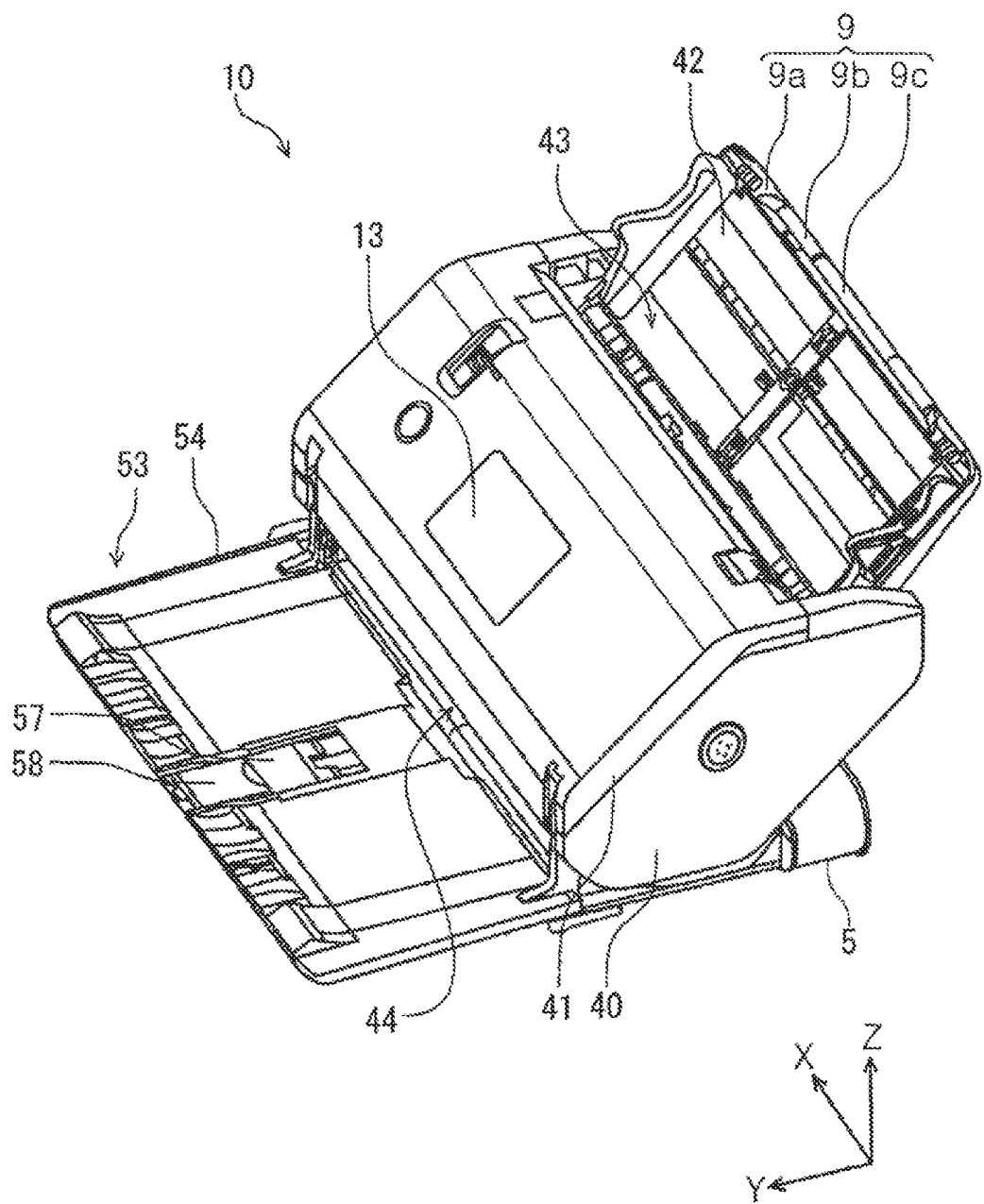
FIG. 9 is a perspective view illustrating an external appearance of the image reading apparatus with the document tray in an open state and the ejection tray in an ejection posture.
Figure 10:
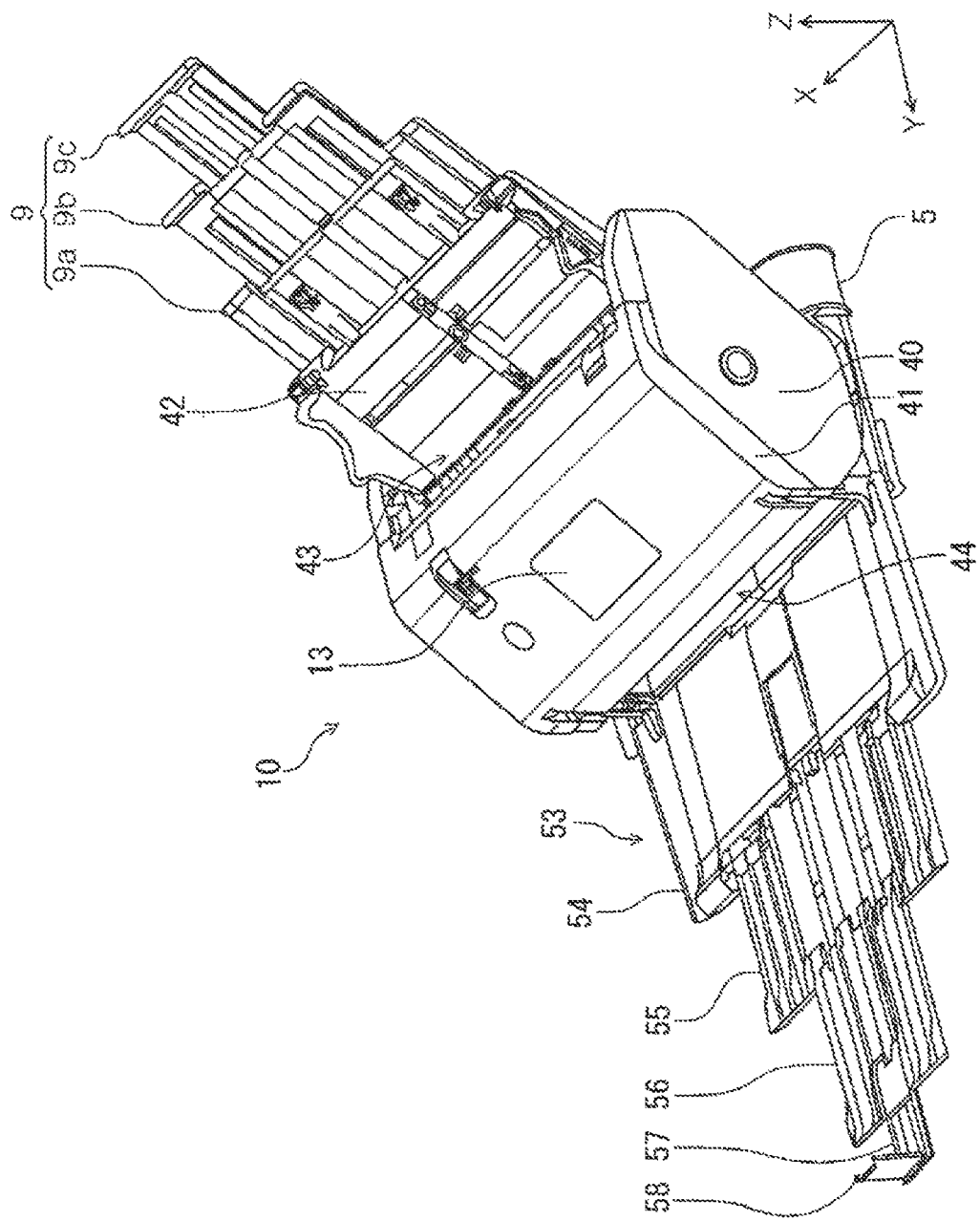
FIG. 10 is a perspective view illustrating an external appearance of the image reading apparatus with the document tray and the ejection tray extended.

FIGS. 8, 9, and 10 are perspective views illustrating an example of an external appearance of the image reading apparatus 10. In comparison with FIG. 2, FIGS. 8 to 10 illustrate the image reading apparatus 10 of a design closer to the actual product. As illustrated also in FIG. 2, the external appearance of the image reading apparatus 10 is substantially composed of the lower unit 40 and the upper unit 41, and the image reading apparatus 10 includes the supply port 43 and the ejection port 44. The reference number 5 denotes a supporting unit 5 that supports the housing of the product including the lower unit 40 and the upper unit 41 at the installation surface. The supporting unit 5 is also referred to as base. In the X, Y, and Z directions orthogonal to each other, the X direction corresponds to the left direction, the Y direction corresponds to the front direction, and the Z direction corresponds to the upward direction.

The document tray 42 is supported in a turnable manner with respect to housing, and is in a closed state in FIG. 8. The document tray 42 in the closed state closes the supply port 43. The user sets the document tray 42 to the open state by raising the document tray 42 in the closed state by turning it from the front side to the rear side as illustrated in FIG. 9. When the document tray 42 is set to the open state, the document tray 42 and the supply port 43 can be used. In FIGS. 8 to 10, the document tray 42 corresponds to an example of "cover" that is displaceable to open and close at least a part of the housing of the image reading apparatus 10.

The image reading apparatus 10 includes an ejection tray 53 for receiving the ejection of the medium by the transport unit 16. The ejection tray 53 is displaceable to an ejection posture that enables the reception of the ejection of the medium and to a non-used posture that does not enable the reception of the ejection. In FIG. 2, the illustration of the ejection tray 53 is omitted. The ejection tray 53 is supported in a turnable manner with respect to the housing in front of the document tray 42, and is in the non-used posture in FIG. 8. The ejection tray 53 in the non-used posture covers a large part of the upper unit 41 from the front side, and closes the operation panel 13 provided in the upper unit 41.

The user sets the ejection tray 53 to the ejection posture by turning the ejection tray 53 in the non-used posture to the rear side as illustrated in FIG. 9. The ejection tray 53 in the ejection posture can receive the medium ejected by the transport unit 16 from the ejection port 44. In addition, by setting the ejection tray 53 to the ejection posture, the user can operate the operation panel 13. That is, the user sets the document tray 42 to the closed state to set the ejection tray 53 to the non-used posture when the user does not use the image reading apparatus 10, whereas the user sets the document tray 42 to the open state to set the ejection tray 53 to the ejection posture when the user uses the image reading apparatus 10.

The document tray 42 may include an auxiliary document tray 9 that can be switched between a state where it is pulled out from the document tray 42 as illustrated in FIG. 10, and a state where it is housed in the document tray 42 as illustrated in FIG. 9. The auxiliary document tray 9 is, for example, composed of three trays, namely, a first auxiliary tray 9a, a second auxiliary tray 9b, and a third auxiliary tray 9c. By setting the auxiliary document tray 9 to the pulled state as illustrated in FIG. 10, the length of the document tray 42 can be extended. In addition, the user sets the document tray 42 to the closed state illustrated in FIG. 8 after housing the auxiliary document tray 9 in the document tray 42.

As illustrated in FIG. 10, the ejection tray 53 may include a first tray 54 that receives the medium ejected from the ejection port 44, and a second tray 55 configured to be housed in the first tray 54. In addition, the second tray 55 may include a third tray 56 that can be housed in the second tray 55, and the third tray 56 may include a fourth tray 57 that can be housed in the third tray 56. With the second tray 55, the third tray 56, and the fourth tray 57, the length of the ejection tray 53 in the medium ejection direction can be extended. A restriction part 58 that is foldable with respect to the fourth tray 57 and restricts the forward movement of the medium placed at the ejection tray 53 is provided at the tip end of the fourth tray 57. The user sets the ejection tray 53 to the non-used posture illustrated in FIG. 8 after housing the second tray 55, the third tray 56, the fourth tray 57 and the restriction part 58.

It can be recognized that the displacement of the document tray 42 serving as the cover from the closed state to the open state is an indication of the user's intention to place the medium to the document tray 42. In view of this, the control unit 11 may execute the calibration processing of the reading unit 17 also when the cover is displaced from the closed state to the open state.

Figure 11:
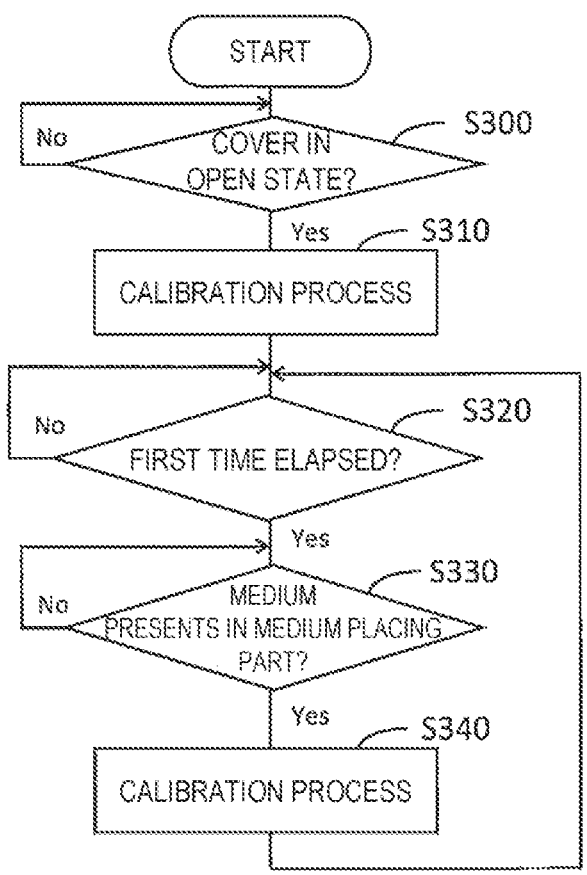
FIG. 11 is a flowchart of processing of repeating a calibration processing in a sixth example.

FIG. 11 illustrates a flowchart of processing of repeatedly executing the calibration processing in a sixth example. For FIG. 11, a difference from FIG. 3 is described.

At step S300, the control unit 11 determines whether the cover is in the open state. The control unit 11 can detect displacement of the document tray 42 to the closed state or the open state through a sensor not illustrated in the drawing. Accordingly, when the control unit 11 detects the displacement of the document tray 42 from the closed state to the open state, it suffices that the control unit 11 determines it as "Yes" at step S300, and advances the process to step S310.

Step S310 is the same as step S110. In addition, the process of repeating steps S320, S330 and S340 after step S310 is the same as the process of repeating the steps S120, S100, S110. Specifically, in the sixth example, when the medium detection sensor 52 detects that a medium is present ("Yes" at step S330) after the elapse of the first time-period from the execution of the calibration processing (step S310) in response to the displacement of the cover to the open state ("Yes" at step S300), the control unit 11 executes the calibration processing (step S340).

On the other hand, even when the medium detection sensor 52 detects that a medium is present before the elapse of the first time-period from the execution of the calibration processing (step S310) in response to the displacement of the cover to the open state ("Yes" at step S300), the period is continuously determined to be "No" at step S320 at that time, and therefore the control unit 11 does not execute step S340. In this case the control unit 11 determines it as "Yes" at step S320, and then determines it as "Yes" at step S330 and executes step S340.

According to the sixth example, the control unit 11 can execute the calibration processing in response to placement of a medium in the placing part, and can execute the calibration processing each time the first time-period elapses in the state where a medium is placed at the medium placing part, while avoiding the execution of the next calibration processing at a timing before the elapse of the first time-period, i.e., a timing earlier than necessary, after the execution of the calibration processing of the reading unit 17 in response to the setting of the cover to the open state.

9. Seventh Example

A seventh example is described with reference to FIGS. 8 to 10 again. It can be recognized that the displacement of the ejection tray 53 from the non-used posture to the ejection posture is an indication of the user's intention to use the image reading apparatus 10. In view of this, the control unit 11 may execute the calibration processing of the reading unit 17 also when the ejection tray 53 is displaced from the non-used posture to the ejection posture.

Figure 12:
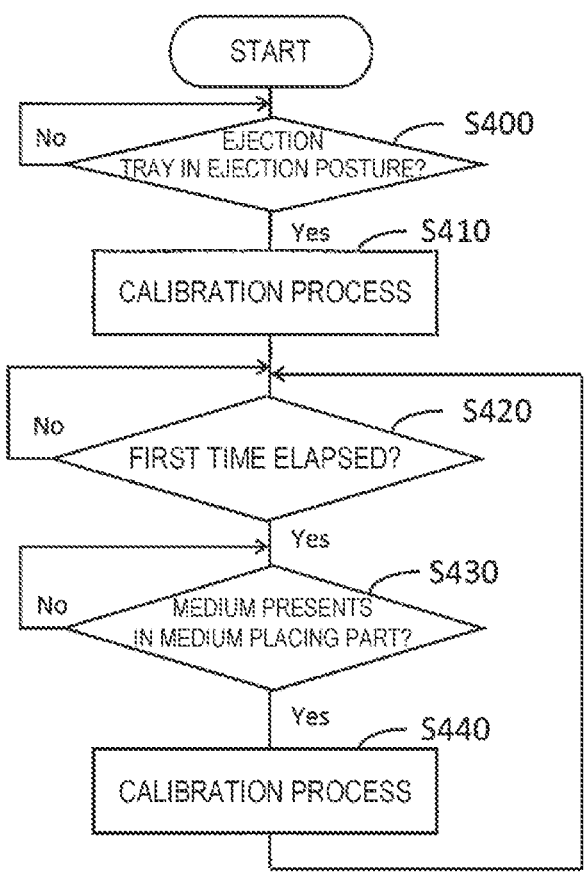
FIG. 12 is a flowchart of processing of repeating a calibration processing in a seventh example.

FIG. 12 illustrates a flowchart of processing of repeatedly executing the calibration processing in a seventh example. FIG. 12 may be understood in the same manner as FIG. 11 by replacing the "cover in open state?" at step S300 in FIG. 11 with "ejection tray in ejection posture?". Specifically, steps S410, S420, S430 and S440 are the same as steps S310, S320, S330, S340. At step S400, the control unit 11 determines whether the ejection tray 53 is in the ejection posture. The control unit 11 can detect the displacement of the ejection tray 53 to the non-used posture or the ejection posture with a sensor not illustrated in the drawing. Thus, when the control unit 11 determines that the ejection tray 53 is displaced from the non-used posture to the ejection posture, it suffices that the control unit 11 determines it as "Yes" at step S400 and advances the process to step S410.

Specifically, in the seventh example, when the medium detection sensor 52 detects that a medium is present ("Yes" at step S430) after the elapse of the first time-period from the execution of the calibration processing (step S410) in response to the displacement of the ejection tray 53 to the ejection posture ("Yes" at step S400), the control unit 11 executes the calibration processing (step S440).

On the other hand, even when the medium detection sensor 52 detects that a medium is present before the elapse of the first time-period from the execution of the calibration processing (step S410) in response to the displacement of the ejection tray 53 to the ejection posture ("Yes" at step S400), the period is continuously determined to be "No" at step S420 at that time, and therefore the control unit 11 does not execute step S440. In this case, the control unit 11 determines it as "Yes" at step S420, and then determines it as "Yes" at step S430 and executes step S440.

According to the seventh example, the control unit 11 can execute the calibration processing in response to placement of a medium in the placing part, and can execute the calibration processing each time the first time-period elapses in the state where a medium is placed at the medium placing part, while avoiding the execution of the next calibration processing at a timing before the elapse of the first time-period, i.e., a timing earlier than necessary, after the execution of the calibration processing of the reading unit 17 in response to the setting of the ejection tray 53 to the ejection posture.

What is claimed is:

1. An image reading apparatus, comprising:
   a medium placing part at which a medium is placed;
   a medium detection sensor configured to detect presence or absence of the medium at the medium placing part;
   a transport unit configured to transport the medium placed at the medium placing part, wherein the transport unit comprises at least one of a roller or a motor;
   a reading unit configured to read the medium transported by the transport unit and output a reading result, wherein the reading unit comprises at least one of a light source, an image sensor, a lens or a mirror; and
   a processor configured to control the transport unit and the reading unit,
   wherein
      before transporting of the medium by the transport unit, the processor is further configured to execute a calibration processing of calibrating the reading unit when the medium detection sensor detects that the medium is present,
      the processor is further configured to execute, after the calibration processing, the calibration processing each time a first time-period elapses in a state where the medium detection sensor detects that the medium is present, and
      when a start instruction of reading the medium is received, the processor is further configured to start transport of the medium by the transport unit, and cause the reading unit to read the medium on a basis of calibration information of a last calibration processing.

2. The image reading apparatus according to claim 1, wherein the processor is further configured to execute a first calibration processing and a second calibration processing in the calibration processing, the first calibration processing being processing of calibrating the reading unit by setting a reading resolution of the reading unit to a first reading resolution, the second calibration processing being processing of calibrating the reading unit by setting the reading resolution to a second reading resolution lower than the first reading resolution; and
   when the start instruction is received, the processor is further configured to select one of calibration information of the first calibration processing or calibration information of the second calibration processing in accordance with a setting of the reading resolution according to the start instruction, and cause the reading unit to read the medium on a basis of the selected calibration information.

3. The image reading apparatus according to claim 1, wherein
   the processor is further configured to execute a first calibration processing and calibration information generation processing in the calibration processing, the first calibration processing being processing of calibrating the reading unit by setting a reading resolution of the reading unit to a first reading resolution, the calibration information generation processing being processing of generating calibration information for calibrating the reading unit when the reading resolution is set to a second reading resolution lower than the first reading resolution, on a basis of calibration information of the first calibration processing; and
   when the start instruction is received, the processor is further configured to select one of the calibration information of the first calibration processing or the calibration information generated by the calibration information generation processing in accordance with a setting of the reading resolution according to the start instruction, and cause the reading unit to read the medium on a basis of the selected calibration information.

4. The image reading apparatus according to claim 1, wherein in the calibration processing, the processor is further configured to acquire acquires, from a storage unit, a predefined reading resolution stored in the storage unit as a reading resolution to be employed by the reading unit for reading of the medium, and calibrates the reading unit by setting the predefined reading resolution as the reading resolution of the reading unit.

5. The image reading apparatus according to claim 1, wherein in the calibration processing, the processor is further configured to calibrate the reading unit by setting, as a reading resolution of the reading unit, a reading resolution employed relatively large number of times in the past for reading of the medium among resolutions that are employable by the reading unit.

6. The image reading apparatus according to claim 1, wherein
the processor is further configured to cause the image reading apparatus to shift from a normal mode to a power saving mode with lower power consumption than the normal mode; and
when a mode of the image reading apparatus is shifted from the normal mode to the power saving mode in a state where the medium detection sensor detects that the medium is present, the processor does not execute the calibration processing even after the first time-period elapses in the power saving mode.

7. The image reading apparatus according to claim 6, wherein when the image reading apparatus is returned from the power saving mode to the normal mode, the processor is further configured to execute the calibration processing corresponding to the medium detection sensor detecting that the medium is present.

8. The image reading apparatus according to claim 1, comprising a cover that is displaceable to open and close at least a part of a housing of the image reading apparatus,
wherein when the cover is displaced from a closed state to an open state, the processor is further configured to execute the calibration processing.

9. The image reading apparatus according to claim 8, wherein
the processor does not execute the calibration processing corresponding to the medium detection sensor detecting that the medium is present before an elapse of the first time-period from execution of the calibration processing in response to displacement of the cover to the open state; and
the processor is further configured to execute the calibration processing when the medium detection sensor detects that the medium is present after an elapse of the first time-period from execution of the calibration processing in response to displacement of the cover to the open state.

10. The image reading apparatus according to claim 1, comprising an ejection tray configured to receive the medium ejected by the transport unit, the ejection tray being displaceable to an ejection posture that enables reception of the ejected medium, and a non-used posture that does not enable the reception of the ejected medium,
wherein when the ejection tray is displaced from the non-used posture to the ejection posture, the processor is further configured to execute the calibration processing.

11. The image reading apparatus according to claim 10, wherein
the processor does not execute the calibration processing when the medium detection sensor detects that the medium is present before an elapse of the first time-period from execution of the calibration processing in response to displacement of the ejection tray to the ejection posture; and
the processor is further configured to execute the calibration processing when the medium detection sensor detects that the medium is present after an elapse of the first time-period from execution of the calibration processing in response to displacement of the ejection tray to the ejection posture.

12. An image reading apparatus, comprising:
a medium placing part at which a medium is placed;
a medium detection sensor configured to detect presence or absence of the medium at the medium placing part;
a transport unit configured to transport the medium placed at the medium placing part, wherein the transport unit comprises at least one of a roller or a motor;
a reading unit configured to read the medium transported by the transport unit and output a reading result, wherein the reading unit comprises at least one of a light source, an image sensor, a lens or a mirror; and
a processor configured to control the transport unit and the reading unit,
wherein
the processor is further configured to execute a calibration processing of calibrating the reading unit when the medium detection sensor detects that the medium is present,
the processor is further configured to execute a first calibration processing and a second calibration processing in the calibration processing, the first calibration processing being processing of calibrating the reading unit by setting a reading resolution of the reading unit to a first reading resolution, the second calibration processing being processing of calibrating the reading unit by setting the reading resolution to a second reading resolution lower than the first reading resolution,
the processor is further configured to execute, after the calibration processing, the calibration processing each time a first time-period elapses in a state where the medium detection sensor detects that the medium is present, and
when a start instruction of reading the medium is received, the processor is further configured to:
select one of calibration information of the first calibration processing or calibration information of the second calibration processing in accordance with a setting of the reading resolution according to the start instruction;
start transport of the medium by the transport unit; and
cause the reading unit to read the medium on a basis of the selected calibration processing.

13. An image reading apparatus, comprising:
a medium placing part at which a medium is placed;
a medium detection sensor configured to detect presence or absence of the medium at the medium placing part;
a transport unit configured to transport the medium placed at the medium placing part, wherein the transport unit comprises at least one of a roller or a motor;
a reading unit configured to read the medium transported by the transport unit and output a reading result, wherein the reading unit comprises at least one of a light source, an image sensor, a lens or a mirror; and
a processor configured to control the transport unit and the reading unit,
wherein
the processor is further configured to execute a calibration processing of calibrating the reading unit when the medium detection sensor detects that the medium is present,
the processor is further configured to execute a first calibration processing and a second calibration processing in the calibration processing, the first calibration processing being processing of calibrating the reading unit by setting a reading resolution of the reading unit to a first reading resolution, the calibration information generation processing being processing of generating calibration information for calibrating the reading unit when the reading resolution is set to a second reading resolution lower than the first reading resolution, on a basis of calibration information of the first calibration processing, the processor executes, after the calibration processing, the calibration processing each time a first time-period elapses in a state where the medium detection sensor detects that the medium is present, and when a start instruction of reading the medium is received, the processor is further configured to:
select one of the calibration information of the first calibration processing or the calibration information generated by the calibration information generation processing in accordance with a setting of the reading resolution according to the start instruction,
start transport of the medium by the transport unit, and
cause the reading unit to read the medium on a basis of the selected calibration processing.

14. An image reading apparatus, comprising:
a medium placing part at which a medium is placed;
a medium detection sensor configured to detect presence or absence of the medium at the medium placing part;
a transport unit configured to transport the medium placed at the medium placing part, wherein the transport unit comprises at least one of a roller or a motor;
a reading unit configured to read the medium transported by the transport unit and output a reading result, wherein the reading unit comprises at least one of a light source, an image sensor, a lens or a mirror; and
a processor configured to control the transport unit and the reading unit,
wherein
the processor is further configured to execute a calibration processing of calibrating the reading unit when the medium detection sensor detects that the medium is present,
the processor is further configured to execute, after the calibration processing, the calibration processing each time a first time-period elapses in a state where the medium detection sensor detects that the medium is present,
when a start instruction of reading the medium is received, the processor is further configured to start transport of the medium by the transport unit, and cause the reading unit to read the medium on a basis of calibration information of a last calibration processing, and
in the calibration processing, the processor is further configured to acquire, from a storage unit, a predefined reading resolution stored in the storage unit as a reading resolution to be employed by the reading unit for reading of the medium, and calibrate the reading unit by setting the predefined reading resolution as the reading resolution of the reading unit.

15. An image reading apparatus, comprising:
a medium placing part at which a medium is placed;
a medium detection sensor configured to detect presence or absence of the medium at the medium placing part;
a transport unit configured to transport the medium placed at the medium placing part, wherein the transport unit comprises at least one of a roller or a motor;
a reading unit configured to read the medium transported by the transport unit and output a reading result, wherein the reading unit comprises at least one of a light source, an image sensor, a lens or a mirror; and
a processor configured to control the transport unit and the reading unit,
wherein
the processor is further configured to execute a calibration processing of calibrating the reading unit when the medium detection sensor detects that the medium is present,
the processor is further configured to execute, after the calibration processing, the calibration processing each time a first time-period elapses in a state where the medium detection sensor detects that the medium is present,
when a start instruction of reading the medium is received, the processor is further configured to start transport of the medium by the transport unit, and cause the reading unit to read the medium on a basis of calibration information of a last calibration processing, and
in the calibration processing, the processor is further configured to calibrate the reading unit by setting, as a reading resolution of the reading unit, a reading resolution employed relatively large number of times in the past for reading of the medium among resolutions that are employable by the reading unit.

16. An image reading apparatus, comprising:
a medium placing part at which a medium is placed;
a medium detection sensor configured to detect presence or absence of the medium at the medium placing part;
a transport unit configured to transport the medium placed at the medium placing part, wherein the transport unit comprises at least one of a roller or a motor;
a reading unit configured to read the medium transported by the transport unit and output a reading result, wherein the reading unit comprises at least one of a light source, an image sensor, a lens or a mirror; and
a processor configured to control the transport unit and the reading unit,
wherein
the processor is further configured to execute a calibration processing of calibrating the reading unit when the medium detection sensor detects that the medium is present,
the processor is further configured to execute, after the calibration processing, the calibration processing each time a first time-period elapses in a state where the medium detection sensor detects that the medium is present,
when a start instruction of reading the medium is received, the processor is further configured to start transport of the medium by the transport unit, and cause the reading unit to read the medium on a basis of calibration information of a last calibration processing,
the processor is further configured to cause the image reading apparatus to shift from a normal mode to a power saving mode with lower power consumption than the normal mode; and
when a mode of the image reading apparatus is shifted from the normal mode to the power saving mode in a state where the medium detection sensor detects that the medium is present, the processor does not execute the calibration processing even after the first time-period elapses in the power saving mode.

17. An image reading apparatus, comprising:
a medium placing part at which a medium is placed;

a medium detection sensor configured to detect presence or absence of the medium at the medium placing part;

a transport unit configured to transport the medium placed at the medium placing part, wherein the transport unit comprises at least one of a roller or a motor;

an ejection tray configured to receive the medium ejected by the transport unit, the ejection tray being displaceable to an ejection posture that enables reception of the ejected medium, and a non-used posture that does not enable the reception of the ejected medium;

a reading unit configured to read the medium transported by the transport unit and output a reading result, wherein the reading unit comprises at least one of a light source, an image sensor, a lens or a mirror; and a processor configured to control the transport unit and the reading unit, wherein the processor is further configured to execute a calibration processing of calibrating the reading unit when the medium detection sensor detects that the medium is present, and the ejection tray is displaced from the non-used posture to the ejection posture the processor is further configured to execute, after the calibration processing, the calibration processing each time a first time-period elapses in a state where the medium detection sensor detects that the medium is present, when a start instruction of reading the medium is received, the processor is further configured to start transport of the medium by the transport unit, and cause the reading unit to read the medium on a basis of calibration information of a last calibration processing.

* * * * *